US012606450B2

(12) United States Patent　　　(10) Patent No.:　US 12,606,450 B2

Srivastava et al.　　　(45) Date of Patent:　Apr. 21, 2026

(54) AMMONIA PRODUCTION

(71) Applicant: Nederlandse Organisatie voor toegepast-natuurwetenschappelijk onderzoek TNO, 's-Gravenhage (NL)

(72) Inventors: Tanya Srivastava, Schiedam (NL); Anca Anastasopol, Pijnacker (NL); Earl Lawrence Vincent Goetheer, Mol (BE)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 505 days.

(21) Appl. No.: 18/254,208

(22) PCT Filed: Nov. 23, 2021

(86) PCT No.: PCT/NL2021/050715

§ 371 (c)(1),
(2) Date: May 24, 2023

(87) PCT Pub. No.: WO2022/114952

PCT Pub. Date: Jun. 2, 2022

(65) Prior Publication Data

US 2024/0002244 A1　　Jan. 4, 2024

(30) Foreign Application Priority Data

Nov. 24, 2020　(EP) ..................................... 20209524

(51) Int. Cl.
| | |
|---|---|
| *C01C 1/02* | (2006.01) |
| *C01B 21/06* | (2006.01) |
| *C25C 3/02* | (2006.01) |

(52) U.S. Cl.
CPC .............. *C01C 1/02* (2013.01); *C01B 21/061* (2013.01); *C25C 3/02* (2013.01)

(58) Field of Classification Search
None
See application file for complete search history.

(56) References Cited

U.S. PATENT DOCUMENTS

| | | | |
|---|---|---|---|
| 2009/0090638 A1* | 4/2009 | Kelly ........................ | C01B 6/21 |
| | | | 205/406 |
| 2018/0029895 A1 | 2/2018 | McEnaney et al. | |

OTHER PUBLICATIONS

Lazouski, N., et al. Understanding continuous lithium-mediated electrochemical nitrogen reduction. Joule 3, 1127-1139 (2019). (Year: 2019).*
Alpen, U. V. Li3N: A promising Li ionic conductor. Journal of Solid State Chemistry 29, 379-392 (1979). (Year: 1979).*
Jay A. Schwalbe et al.; "A Combined Theory-Experiment Analysis of the Surface Species in Lithium-Mediated NH3 Electrosynthesis"; ChemElectroChem; vol. 7, No. 7; Jan. 7, 2020; pp. 1542-1549.
Akira Tsuneto et al.; "Lithium-Mediated Electrochemical reduction of high pressure N2 to NH3"; Journal of Electroanalytical Chemistry and Interfacial Electrochemistry; vol. 367, No. 1-2; Mar. 4, 1994; pp. 183-188.
International Search Report issued in PCT/NL2021/050715; mailed Oct. 2, 2022.
Written Opinion of the International Searching Authority issued in PCT/NL2021/050715; mailed Oct. 2, 2022.

* cited by examiner

*Primary Examiner* — Anthony J Zimmer
*Assistant Examiner* — Zachary John Baum
(74) *Attorney, Agent, or Firm* — Studebaker Brackett PLLC

(57)　　　　ABSTRACT

The invention is directed to a method of preparing $NH_3$, and to a method of regenerating a metal M from $MOR^1$, wherein O is oxygen and $R^1$ is $—CH_3$ and/or $—C_2H_5$.
The method for preparing $NH_3$ comprises the steps of
　　a) reacting a metal with nitrogen gas to produce a metal nitride, wherein the metal is selected from the group consisting of Li, Be, Mg, Na, Mo, Al, Zn, Ca, Sr, and Ba,
　　b) reacting the metal nitride obtained in step a) with $R^1OH$ to produce $NH_3$ and $MOR^1$, wherein $R^1$ represents $—CH_3$ and/or $—C_2H_5$, and
　　c) regenerating the metal by electrolysing said $MOR^1$ under formation of HCHO and/or $CH_3CHO$.
The method of regenerating a metal M from $MOR^1$, comprises electrolysing of $MOR^1$ under formation of HCHO and/or $CH_3CHO$, wherein $R^1$ represents $—CH_3$ and/or $—C_2H_5$.

17 Claims, No Drawings

AMMONIA PRODUCTION

The invention is directed to a method of preparing $NH_3$, and to a method of regenerating a metal M from $MOR^1$, wherein O is oxygen and $R^1$ is —$CH_3$ and/or —$C_2H_5$.

Ammonia ($NH_3$) production is critical for ensuring food security for a growing world population. Ammonia is the preferred nutrient for plant growth. It is converted to nitrite and nitrate by bacteria and then used by plants. There is still a large challenge in sustainably producing ammonia. The two predominantly used processes are the industrial Haber-Bosch process and the enzymatic nitrogenase process. These two processes are very different.

The Haber-Bosch process is the reaction of nitrogen and hydrogen to produce ammonia. The nitrogen and hydrogen gases are reacted, usually over an iron or ruthenium catalyst, for example one containing trivalent iron. The reaction is carried out according to equation (1) below.

$$N_2 + 3H_2 \leftrightarrow 2N\,H_3 \tag{1}$$

The reaction of equation (1) is reversible, i.e. the reaction can proceed in both directions, depending on the conditions. The forward reaction is exothermic and is favoured at low temperatures. Increasing the temperature tends to drive the reaction in the reverse direction, which is undesirable if the goal is to produce ammonia. However, lowering the temperature reduces the rate of the reaction, which is also undesirable. Therefore, an intermediate temperature high enough to allow the reaction to proceed at a reasonable rate, yet not so high as to drive the reaction in the reverse direction, is required. Usually, temperatures in the range of 400-500° C. are employed.

High pressures favour the forward reaction because there are four mols of reactant for every two mols of product, meaning that the position of the equilibrium will shift to the right to produce more ammonia because reduction in the number of mols of gas in the reaction vessel will tend to reduce the pressure, all else being held constant. However, the higher the pressure, the more robust and expensive the reaction vessel and associated apparatus must be. Therefore, the pressure is increased as much as possible consonant with the cost of equipment. Usually, pressures in the order of 140-250 bar are used, typically 200-250 bar.

The industrial production of ammonia using the Haber-Bosch process has a number of disadvantages, including the large expenses that must be incurred for equipment that can operate safely under very high pressures and high temperatures, and also the operating costs of heating materials and apparatus to such high temperatures. It would be advantageous from an economic viewpoint to eliminate at least part of these expenses.

Additionally, the Haber-Bosch process is environmentally intensive. Production of ammonia consumes nearly 1.2% of total primary energy globally and also emits between 2 and 3 tons of $CO_2$ on average per ton of ammonia produced. This results in an annual release of 450 Mt of $CO_2$. Thus, it is further desirable to move towards a sustainable ammonia production process that can use renewable energy.

In biological processes, the enzyme nitrogenase reduces $N_2$ molecules using high energy electrons released through the hydrolysis of sixteen ATP molecules. Since this biological process can take place at ambient pressures and temperatures, understanding of this process might contribute to the development of alternative ammonia synthesis routes that function under milder conditions.

Currently, research is being carried out to mimic the bacterial enzymatic processes to produce ammonia. Several photochemical and electrochemical routes using heterogenous catalysts are being investigated to this end.

Murakami et al. (*Electrochimica Acta* 2005, 50, 5423-5426) disclose a novel ammonia synthesis method from water vapour and nitrogen gas under atmospheric pressure at lower temperature than the Haber-Bosch process. The electrolyte is molten alkaline chlorides containing nitride ions ($N^{3-}$). Ammonia is formed by the chemical reaction between water vapour and nitride ions in the melt, according to the overall equation (2).

$$\frac{3}{2}H_2O + \frac{1}{2}N_2 \to NH_3 + \frac{3}{4}O_2 \tag{2}$$

US-A-2018/0 029 895 provides an electro-thermochemical cycling system for producing $NH_3$. In a first step, LiOH is reduced. In a second step, $N_2$ is introduced to the Li metal to thermochemically produce $Li_3N$. The final step introduces $H_2O$ to the $Li_3N$ in an exothermic release of $NH_3$, thereby reproducing LiOH.

DE-A-10 2018 210 304 discloses an electrochemical process for producing $NH_3$, wherein a metal is electrolytically produced at a cathode and subsequently converted into a metal nitride by exposure to $N_2$ gas, after which the metal nitride is converted into $NH_3$ at the anode of an electrochemical cell.

U.S. Pat. No. 8,916,123 discloses the production of $NH_3$ in an electrolytical cell having a lithium ion conductive membrane that divides the electrochemical cell into an anolyte compartment and a catholyte compartment. The catholyte compartment includes a porous cathode closely associated with the lithium ion conductive membrane. The non-electrochemical reaction involves reacting lithium nitride with water and/or steam to produce $NH_3$.

The current efficiencies of the above processes, however, are small (usually well below 1%) due to the stability of the $N_2$ triple bond and competing hydrogen evolution reaction.

Tsuneto et al. (*Journal of Electroanalytical Chemistry and Interfacial Electrochemistry* 1994, 367, 183-188) disclose lithium-mediated electrochemical reduction of high pressure $N_2$ to $NH_3$. $NH_3$ was formed by the electrolysis of a solution of $LiClO_4$ in tetrahydrofuran under atmospheric pressure of $N_2$.

Schwalbe et al. (*ChemElectro Chem* 2020, 7, 1542-1549) disclose details of ammonia synthesis on electrodeposited lithium in tetrahydrofuran. First, lithium is reduced from solution, next it reacts with nitrogen to form lithium nitride, and finally lithium nitride reacts with ethanol to yield ammonia.

There remains a need in the art for further processes to produce $NH_3$, which at least partly overcome the disadvantages faced in the art and/or which have additional advantages.

One of the objectives of the invention is to address this need in the art.

A further objective is to provide an economically feasible production method of $NH_3$.

Yet a further objective of the invention is to provide a suitable regeneration of a metal from a metal methoxide and/or ethoxide.

The inventors surprisingly found that one or more of these objectives can be met by a method of preparing $NH_3$ from $N_2$ and methanol and/or ethanol using a specific metal, which can readily be regenerated.

Accordingly, in a first aspect the invention is directed to a method of preparing $NH_3$, comprising the steps of a) reacting a metal with nitrogen gas to produce a metal nitride, wherein the metal is selected from the group consisting of Li, Be, Mg, Na, Mo, Al, Zn, Ca, Sr, Ba, and any combination thereof, b) reacting the metal nitride obtained in step a) with $R^1OH$ to produce $NH_3$ and $MOR^1$, wherein $R^1$ represents —$CH_3$ and/or —$C_2H_5$, and c) regenerating the metal by electrolysis of said $MOR^1$ under formation of HCHO and/or $CH_3CHO$.

The method of the invention allows for integration with renewable energy sources and potential for localised ammonia production. While similar concepts with LiOH cycling are known (e.g. from US-A-2018/0 029 895), this involves reduction of $Li^+$ to Li which then reacts with nitrogen. The reduction of LiOH to Li and oxygen is energy intensive and increases the cost of $NH_3$ production. The invention is less energy intensive due to the lower potentials needed to oxidise the methoxide to formaldehyde and/or ethoxide to acetaldehyde, as compared to the production of oxygen.

The reaction with methanol and/or ethanol in the method of the invention also provides formaldehyde and/or acetaldehyde as valuable by-product(s). This further improves process economics.

Step a) involves the reaction of a metal with nitrogen to produce a metal nitride. If the metal is aluminium, then this reaction is according to equation (3a), wherein M 1 is aluminium.

$$2M^1 + N_2 \rightarrow 2M^1N \qquad (3a)$$

If the metal is molybdenum, then this reaction is according to equation (3b), wherein M 2 is molybdenum.

$$4M^2 + N_2 \rightarrow 2M_2{}^2N \qquad (3b)$$

If the metal is lithium or sodium, then this reaction is according to equation (3c), wherein M 3 is the metal.

$$6M^3 + N_2 \rightarrow 2M_3{}^3N \qquad (3c)$$

If the metal is selected from the group consisting of Be, Mg, Zn, Ca, Sr, and Ba, then this reaction is according to equation (3d), wherein M 4 is the metal.

$$3M^4 + N_2 \rightarrow M_3{}^4N_2 \qquad (3d)$$

Step a) will produce heat that may be employed in subsequent steps of the process, such as in steps b) and/or step c).

In step b), $NH_3$ is produced by reacting the metal nitride with $R^1OH$, wherein $R^1$ represents —$CH_3$ and/or —$C_2H_5$ (i.e. $R^1OH$ is methanol and/or ethanol). As an example, in the case where the metal is lithium, this step is according to equation (4).

$$Li_3N + 3R^1OH \rightarrow NH_3 + 3LOR^1 \qquad (4)$$

It will be apparent to the person skilled in the relevant technical field that the production of $NH_3$ in step b) can likewise be performed with other metals as defined herein.

In step c), the metal is regenerated and formaldehyde with methanol and/or acetaldehyde with ethanol is produced as a by-product. Again taking lithium as exemplary metal, this step is according to equations (5)-(7), wherein $R^2$ represents —CH and/or —$CH_3$.

$$\text{Cathode: } Li^+ + e^- \rightarrow Li \qquad (5)$$

$$\text{Anode: } 2R^1O^- \rightarrow R^2HO + R^1OH + 2e^- \qquad (6)$$

$$\text{Overall: } 2LiOR^1 \rightarrow 2Li + R^2HO + R^1OH \qquad (7)$$

It will be apparent to the person skilled in the relevant technical field that the metal regeneration in step c) can likewise be performed with other metals, such as those defined herein.

Hence, the overall reaction of the method, including regeneration step c), is then as shown in equation (8) below, wherein $R^1$ and $R^2$ have the above identified meaning.

$$N_2 + 3R^1OH \rightarrow 2NH_3 + 3R^2HO \qquad (8)$$

In accordance with the method of preparing $NH_3$ according to the invention, the metal is selected from the group consisting of Li, Be, Mg, Na, Mo, Al, Zn, Ca, Sr, Ba, and any combination of one or more of these metals. Preferably, the metal comprises, or is, lithium.

Preferably, step a) of the method comprises exposing the metal to flowing $N_2$ gas. This exposing may be done at relatively low temperatures in the range of 20-150° C., preferably 22-100° C., such as 30-90° C., or 40-80° C. Advantageously, step a) may be performed at atmospheric pressure.

Step b) of the method preferably comprises placing the metal nitride obtained in step a) in $R^1OH$ and recovering gaseous $NH_3$. The temperature at which step b) is performed is typically 20-100° C., such as ° C., or 30-70° C. Also this step may be performed at atmospheric pressure.

Preferably, the method of the invention is a metal cycle, wherein regenerated metal obtained in step c) is recycled to step a).

The regeneration step c) is preferably carried out with a molten salt electrolyte as will be described below. The melt is typically maintained at a temperature in the range of 400-600° C., such as 425-500° C. The applied total cell potential can be 2.0-5.0 V, such as 2.5-4.0 V. Advantageously, the regeneration step c) can be carried out at atmospheric pressure.

In a further aspect, the invention is directed to a method of regenerating a metal M from $MOR^1$, comprising electrolysing $MOR^1$ under formation of HCHO and/or $CH_3CHO$, wherein $R^1$ represents —$CH_3$ and/or —$C_2H_5$.

The metal in this aspect of the invention may be any metal, and may, for instance, be selected from the group consisting of Li, Be, Mg, Na, Mo, Al, Zn, Ca, Sr, Ba, and any combination thereof.

This regeneration was found to be particularly advantageous. Without wishing to be bound by any theory, the inventors believe that the energy consumption of $MOR^1$ recycling is lower than that of MOH recycling. Furthermore, during recycling of MOH, water is formed, which could react vigorously with the elemental metal (such as Li, Na, Be, Mg, Ca, Sr, and/or Ba) and can be dangerous. Elemental metal can also reacts with methanol, but this reaction is much less intensive. Additionally, the by-products obtained with the method of the invention, i.e. methanol and formaldehyde, are valuable products, whereas during recycling of MOH, only oxygen is formed.

Accordingly, this method of regenerating Li from $LiOR^1$ is suitably employed in step c) of the method of the invention for producing $NH_3$.

The electrolysis of $MOR^1$ may suitably be performed in a molten salt electrolytic cell. Suitable molten salts include LiOH, LiCl, LiBr, LiI, LiF, and $LiCO_3$. Preferably, the molten salt comprises one or more alkali metal halides. Preferably, the one or more alkali metal halides comprise LiOH, LiCl, LiBr, LiI, LiF, $LiCO_3$, LiOH—LiCl, LiOH—LiCl—KCl, LiCl—KCl, LiOH—KBr, LiCl—$CaCl_2$, LiCl—KCl—CsCl, LiOH—LiCl at the anode. The one or more alkali metal halides can for instance comprise LiCl and/or KCl. This may, for example, be combined with LiCl—KCl at the cathode. However, any other combinations of these and similar salts are also possible. Further examples of suitable molten salts include $LiF-BeF_2$, $MgCl_2$, $MgCl_2$—KCl, $MgCl_2$—KCl—NaCl, $NaNO_3$—$KNO_3$, NaCl, NaF—NaCl—NaI, $LiNO_3$—$NaNO_3$, NaCl—KCl—NaF—$MoO_3$, $AlCl_3$—NaCl, $ZnCl_2$—KCl, $CaCl_2$, NaCl—$CaCl_2$, $KNO_3$—$BaNO_3$.

It is advantageous to use a mixture of salts, because this results in a lower melting point as compared to when using the single salt.

Suitably, an additive can be used for reducing the melting point of the molten metal salt. Some examples of such additives include LiCl, KCl, CsCl, RbCl, LiI and/or alkali earth metal compounds. These compounds may further aid in removing hydrogen, oxygen, and/or hydroxide sources from the cathode.

Suitably, in accordance with the method of the invention, during the electrolysis elemental metal is formed at a cathode and HCHO and/or $CH_3CHO$ is formed at an anode.

The anode and cathode side of the reactor, where $MOR^1$ is regenerated, are preferably separated by a barrier or a diaphragm. However, a cell without barrier could also be used, if the cell is configured such that the metal does not diffuse towards the anode and is continuously removed. The cell is then preferably additionally configured such that methanol and/or formaldehyde does not diffuse to cathode where they could react with metal.

The invention does not require the use of a catalysts at the cathode or anode.

The cathode and/or anode can comprise one or more selected from the group consisting of alkali metals, transition metals, noble metals, metal alloys, conductive ionic compounds, conductive carbon, lithium-based battery electrodes with and without lithium intercalation capabilities, doped and otherwise altered conductive electrodes. Suitable cathode materials include, for example, steel, Ni, Cu, Ti, Mo and/or graphite. Suitable anode materials include, for example, steel Ni, Pt, W, metal alloys, metal oxides and/or graphite.

The invention has been described by reference to various embodiments, and methods. The skilled person understands that features of various embodiments and methods can be combined with each other.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

When referring to a noun in the singular, the plural is meant to be included, or it follows from the context that it should refer to the singular only.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention claimed is:

1. A method of preparing $NH_3$, comprising
reacting a metal with nitrogen gas to produce a metal nitride, wherein the metal is selected from the group consisting of Li, Be, Mg, Na, Mo, Al, Zn, Ca, Sr, Ba, and any combination thereof;
reacting the metal nitride with $R^1OH$ to produce $NH_3$ and $MOR^1$, wherein $R^1$ represents —$CH_3$ and/or —$C_2H_5$; and
regenerating the metal by electrolysing said $MOR^1$ under formation of at least one of HCHO and $CH_3CHO$.

2. The method of claim 1, wherein the metal comprises or is Li.

3. The method of claim 1, wherein reacting the metal with nitrogen gas comprises exposing the metal to flowing $N_2$ gas.

4. The method of claim 3, wherein the exposing is performed at a temperature of 20-150° C.

5. The method of claim 1, wherein reacting the metal nitride with $R^1OH$ comprises placing the metal nitride in $R^1OH$ and recovering gaseous $NH_3$.

6. The method of claim 1, wherein reacting the metal nitride with $R^1OH$ is performed at a temperature of 20-100° C.

7. The method of claim 1, wherein regenerated metal is recycled and reacted with nitrogen gas to produce the metal nitride.

8. The method of claim 1, wherein said electrolysing is carried out in a molten salt electrolytic cell.

9. The method of claim 8, wherein said molten salt comprises one or more alkali metal halides.

10. The method of claim 9, wherein said one or more alkali metal halides comprise at least one of LiCl and KCl.

11. The method of claim 8, wherein the molten salt is maintained at a temperature in the range of 400-600° C.

12. The method of claim 8, wherein a potential of 2.0-5.0 V is applied to the electrolytic cell.

13. The method of claim 1, wherein during said electrolysing metal M is formed at a cathode and at least one of HCHO and $CH_3CHO$ is formed at an anode.

14. A method of regenerating a metal M from $MOR^1$, comprising electrolysing of $MOR^1$ under formation of at least one of HCHO and $CH_3CHO$, wherein $R^1$ represents at least one of —$CH_3$ and —$C_2H_5$.

15. The method of claim 14, wherein the metal is selected from the group consisting of Li, Be, Mg, Na, Mo, Al, Zn, Ca, Sr, Ba, and any combination thereof.

16. The method of claim 14, wherein $MOR^1$ is produced by a method of preparing $NH_3$, comprising reacting a metal with nitrogen gas to produce a metal nitride, wherein the metal is selected from the group consisting of Li, Be, Mg, Na, Mo, Al, Zn, Ca, Sr, Ba, and any combination thereof;

reacting the metal nitride with $R^1OH$ to produce $NH_3$ and $MOR^1$, wherein $R^1$ represents —$CH_3$ and/or —$C_2H_5$; and regenerating the metal by electrolysing said $MOR^1$ under formation of at least one of HCHO and $CH_3CHO$.

17. The method of claim 14, comprising collecting at least one of HCHO and $CH_3CHO$.

\* \* \* \* \*